US009584643B2

(12) United States Patent
Bok et al.

(10) Patent No.: US 9,584,643 B2
(45) Date of Patent: Feb. 28, 2017

(54) TOUCH-BASED MOBILE DEVICE AND METHOD FOR PERFORMING TOUCH LOCK FUNCTION OF THE MOBILE DEVICE

(75) Inventors: Il Geun Bok, Seoul (KR); Seung Woo Shin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 682 days.

(21) Appl. No.: 13/081,598

(22) Filed: Apr. 7, 2011

(65) Prior Publication Data
US 2011/0256848 A1 Oct. 20, 2011

(30) Foreign Application Priority Data

Apr. 14, 2010 (KR) .................. 10-2010-0034244

(51) Int. Cl.
*G06F 3/033* (2013.01)
*H04M 1/67* (2006.01)
*G06F 3/0488* (2013.01)
*H04W 4/20* (2009.01)

(52) U.S. Cl.
CPC .......... *H04M 1/67* (2013.01); *G06F 3/04883* (2013.01); *G06F 2203/04804* (2013.01); *H04W 4/20* (2013.01)

(58) Field of Classification Search
CPC .. G06F 3/0488; G06F 3/04883; G06F 3/0484; G06F 4/04886
See application file for complete search history.

(56) References Cited

U.S. PATENT DOCUMENTS

| 6,072,489 A * | 6/2000 | Gough ................. G06F 3/0481 715/803 |
| 6,720,982 B1 | 4/2004 | Sakaguchi |
| 8,539,382 B2 * | 9/2013 | Lyon .................... G06F 3/0488 455/411 |
| 2006/0061597 A1 * | 3/2006 | Hui ....................... G06F 3/0481 345/629 |
| 2007/0150842 A1 | 6/2007 | Chaudhri et al. |

(Continued)

FOREIGN PATENT DOCUMENTS

| CN | 101625620 A | 1/2010 |
| EP | 1 022 650 A2 | 7/2000 |

(Continued)

*Primary Examiner* — William Bashore
*Assistant Examiner* — Rayeez Chowdhury
(74) *Attorney, Agent, or Firm* — Cha & Reiter, LLC

(57) ABSTRACT

A touch-based mobile device and a method for performing a touch lock function of the mobile device are provided. In the method, the device displays a touch lock screen in which a cover layer is superimposed over a specific underlying screen and allows the underlying screen to be visible. When an input of a touch moving gesture is detected, the device moves the cover layer depending on the touch moving gesture, and determines whether a distance of the touch moving gesture reaches a predefined critical distance. If so, the device removes the cover layer from the touch lock screen and switches the touch lock state to a touch unlock state, thus allowing a user to more conveniently switch the touch lock state to the touch unlock state.

33 Claims, 13 Drawing Sheets

(56) References Cited

U.S. PATENT DOCUMENTS

| | | | |
|---|---|---|---|
| 2008/0122796 A1* | 5/2008 | Jobs | G06F 3/0488 345/173 |
| 2009/0006991 A1 | 1/2009 | Lindberg et al. | |
| 2009/0069056 A1* | 3/2009 | Lee et al. | 455/566 |
| 2009/0094562 A1* | 4/2009 | Jeong | G06F 3/0486 715/863 |
| 2009/0140057 A1* | 6/2009 | Leen | F24F 11/006 236/49.3 |
| 2009/0178008 A1* | 7/2009 | Herz et al. | 715/840 |
| 2009/0264159 A1 | 10/2009 | Hsieh et al. | |
| 2009/0307105 A1* | 12/2009 | Lemay et al. | 705/26 |
| 2010/0001967 A1 | 1/2010 | Yoo | |
| 2010/0159995 A1* | 6/2010 | Stallings | G06F 3/0488 455/566 |
| 2010/0257490 A1* | 10/2010 | Lyon | G06F 3/0488 715/863 |
| 2011/0028186 A1* | 2/2011 | Lee et al. | 455/566 |

FOREIGN PATENT DOCUMENTS

| | | | |
|---|---|---|---|
| EP | 2 045 700 A1 | 4/2009 | |
| KR | 10-2009-0013432 A | 2/2009 | |
| KR | 10-2009-0022924 A | 3/2009 | |
| KR | 10-2009-0034661 A | 4/2009 | |
| KR | 10-2010-0005438 A | 1/2010 | |
| KR | 2010-0073743 | 7/2010 | H04B 1/40 |
| TW | 2009-45128 | 11/2009 | |

\* cited by examiner

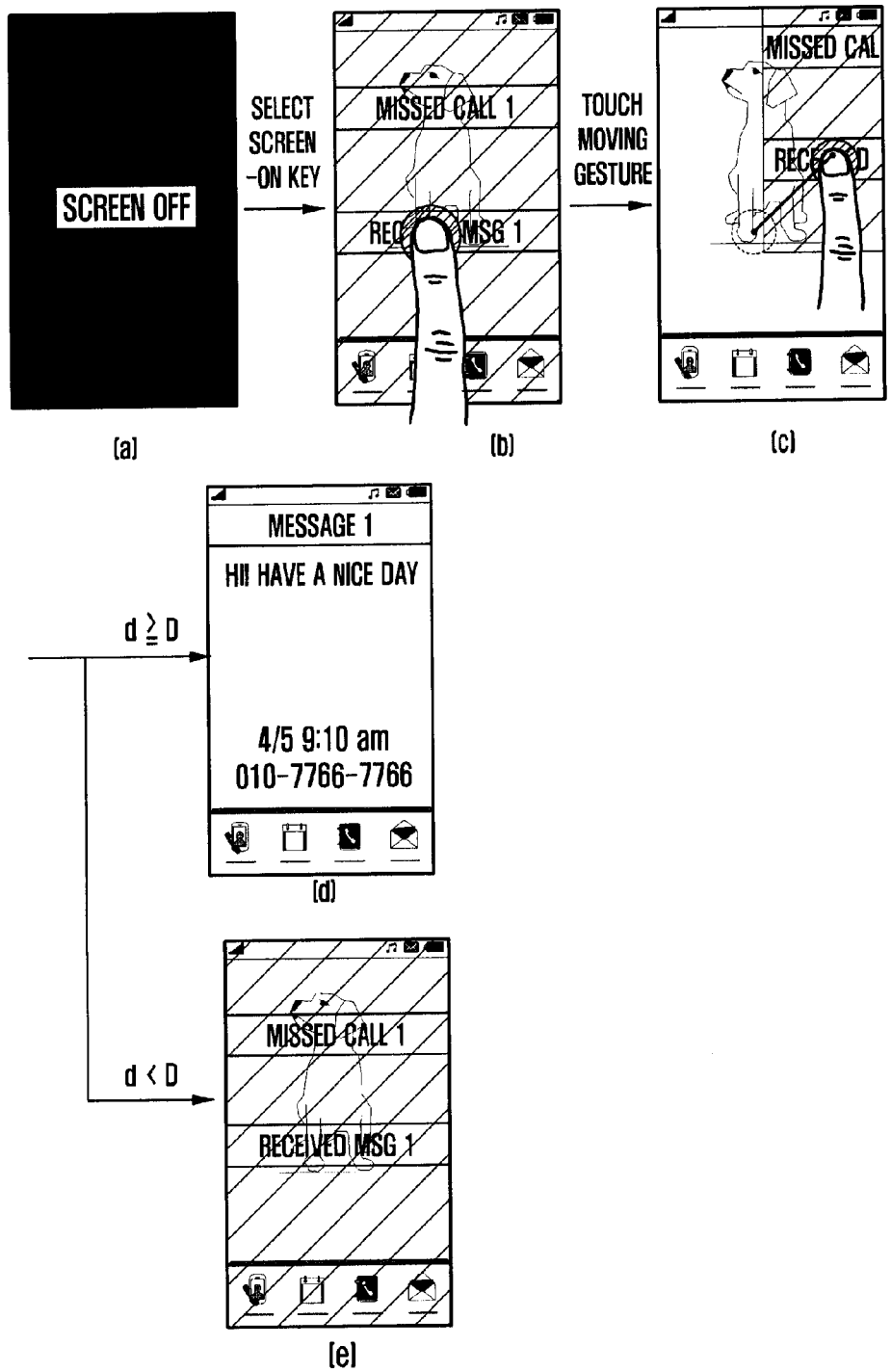

TOUCH-BASED MOBILE DEVICE AND METHOD FOR PERFORMING TOUCH LOCK FUNCTION OF THE MOBILE DEVICE

CLAIM OF PRIORITY

This application makes reference to and claims all benefits accruing under 35 U.S.C. Section 119 from an application entitled "TOUCH-BASED MOBILE DEVICE AND METHOD FOR PERFORMING TOUCH LOCK FUNCTION OF THE MOBILE DEVICE" filed in the Korean Intellectual Property Office on Apr. 14, 2010 and there duly assigned Serial No. 10-2010-0034244.

BACKGROUND OF THE INVENTION

1. Field of the Invention

The present invention relates to a touch lock function of a mobile device and, more particularly, to a mobile device based on a touch screen and a method of performing a touch lock function of the mobile device.

2. Description of the Related Art

With remarkable growths of related technologies, a variety of mobile devices is increasingly popularized in these days. Mobile devices not only provide a basic voice call service, but also offer a data transmission service and other various additional services, thus evolving into multimedia communication devices. Moreover, as market demands for touch-based or touch-sensitive mobile devices are increased, there is a growing tendency to apply a touch screen technology to recent mobile devices.

In order to prevent an improper operation due to an unexpected touch error, most of the touch-based mobile devices have normally a touch lock function. In some mobile devices currently being used, a touch lock function is realized by means of a touch lock/unlock guide screen that contains a certain handler. In such mobile devices, when a user touches a handler displayed on the guide screen and then moves it in a guided direction, a touch lock state is unlocked.

Unfortunately, this may be often inconvenient to a user since a handler displayed on the guide screen requires an exact touch and its movement is restricted to a guided direction only to operate properly. Furthermore, a specific direction fixed for moving a touched handler is not suitable for the use of both a right-handed user and a left-handed user.

BRIEF SUMMARY OF THE INVENTION

Accordingly, the present invention is to address the above-mentioned problems and/or disadvantages and to offer at least the advantages described below.

An aspect of the present invention is to provide a touch-based mobile device and method for performing a touch lock function, thus affording enhanced convenience to a user.

According to one aspect of the present invention, a method for performing a touch lock function of a mobile device includes: displaying a touch lock screen in which a cover layer is overlaid over a specific underlying screen to allow the underlying screen to be visible; when an input of a touch moving gesture is detected, moving the cover layer according to the touch moving gesture; determining whether an amount of the touch moving gesture exceeds a predefined critical distance; and if the amount of the touch moving gesture exceeds the critical distance, removing the cover layer from the touch lock screen, thus switching the a touch lock state to a touch unlock state.

According to another aspect of the present invention, a mobile device includes: a touch screen unit configured to detect a user's touch; and a control unit configured to: display a touch lock screen in which a cover layer is overlaid on a specific underlying screen while permitting the underlying screen to be visible, move the cover layer depending on the touch moving gesture when an input of a touch moving gesture is detected; determine whether an amount of the touch moving gesture reaches a predefined critical distance; and if the amount of the touch moving gesture reaches the critical distance, remove the cover layer from the touch lock screen and switch the touch lock state to a touch unlock state.

Aspects of this invention may allow a user to more conveniently switch a touch lock state to a touch unlock state. Additionally, without unlocking the touch lock state, a user can find a currently running application. These features may increase convenience in the use of the mobile device.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIG. 12 is a diagram illustrating changes in a display screen of a touch-based mobile device while the method shown in FIGS. 11A and 11B is executed.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Although a mobile device will be exemplarily described herein, the present invention is not always limited to the mobile device. Alternatively, the teachings of the present invention may be applied to any other electronic devices having a touch screen or its equivalent. For example, the mobile device according to embodiments of this invention may include a mobile communication terminal, a portable multimedia player (PMP), a personal digital assistant (PDA), a smart phone, an MP3 player, and the like.

Figure 1:
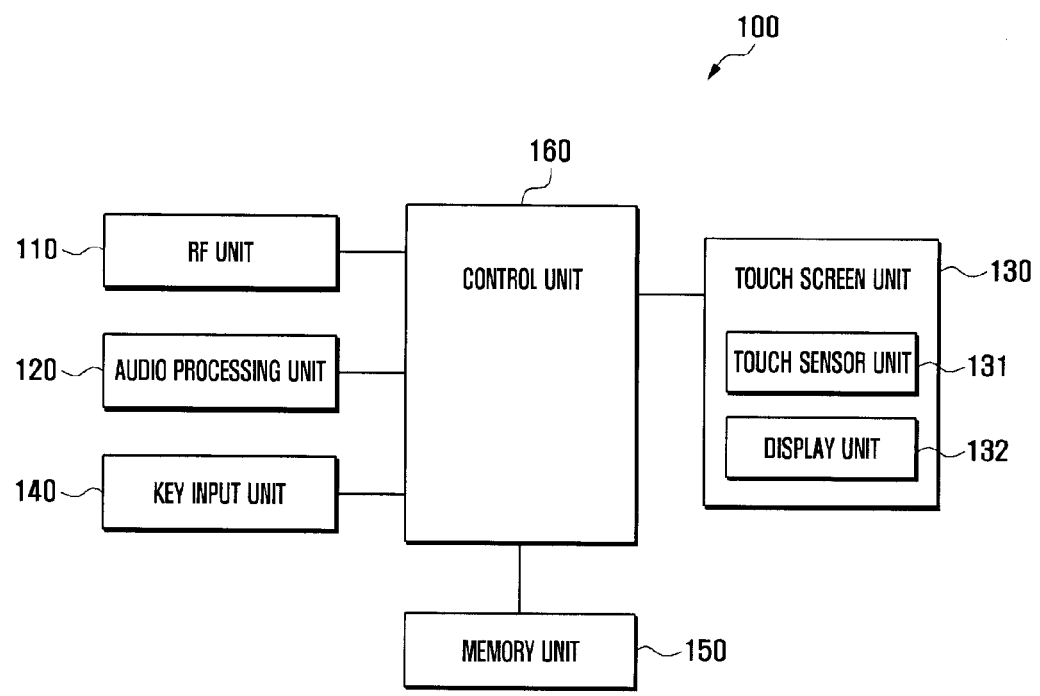
FIG. 1 is a block diagram illustrating the configuration of a touch-based mobile device in accordance with an exemplary embodiment of the present invention.

FIG. 1 is a block diagram illustrating the configuration of a touch-based mobile device in accordance with an exemplary embodiment of the present invention. Referring to FIG. 1, the mobile device 100 in an embodiment of this invention includes a radio frequency (RF) unit 110, an audio processing unit 120, a touch screen unit 130, a key input unit 140, a memory unit 150, and a control unit 160.

The RF unit 110 performs a function to transmit and receive data for a wireless communication of the mobile device 100. Normally the RF unit 110 may include an RF transmitter that up-converts the frequency of an outgoing signal and then amplifies the signal, an RF receiver that amplifies with low-noise an incoming signal and down-converts the frequency of the signal, and the like. Further, the RF unit 110 may receive data through a wireless channel and then output it to the control unit 160, and also receive data from the control unit 160 and then transmit it through a wireless channel.

The audio processing unit 120 may include a codec which may be composed of a data codec for processing packet data and an audio codec for processing an audio signal such as a voice. The audio processing unit 120 converts a digital audio signal into an analog audio signal through the audio codec and then outputs it through a speaker (SPK), and also converts an analog audio signal received from a microphone (MIC) into a digital audio signal through the audio codec.

The touch screen unit 130 includes a touch sensor unit 131 and a display unit 132. The touch sensor unit 131 detects a user's touch input. The touch sensor unit 131 may be touch detection sensors of the type having a capacitive overlay, a resistive overlay or an infrared beam, or may be pressure detection sensors. Alternatively, other various sensors known to artisians or capable of detecting a contact or pressure of an object may be used for the touch sensor unit 131.

In operation, the touch sensor unit 131 detects a user's touch input, creates a detection signal, and transmits the signal to the control unit 160. The detection signal contains coordinate data of a user's touch input. If a touch moving gesture is inputted by a user, the touch sensor unit 131 creates a detection signal containing coordinate data of a moving path of a touched point and then transmits it to the control unit 160. In the embodiment, a touch moving gesture may include a flick gesture that has a greater moving speed than a predefined critical speed, and a drag gesture that has a smaller moving speed than the predefined critical speed.

The display unit 132 may be formed of LCD (Liquid Crystal Display), OLED (Organic Light Emitting Diode), AMOLED (Active Matrix OLED), or any equivalent. The display unit 132 visually offers a menu, input data, function setting information and any other various information of the mobile device 100 to a user. The display unit 132 performs a function to output a booting screen, an idle screen, a menu screen, a call screen, or any other application screens of the mobile device 100.

The key input unit 140 receives a user's key manipulation for controlling the mobile device 100, creates a corresponding input signal, and then delivers it to the control unit 160. The key input unit 140 may be formed of a keypad having alphanumeric keys and navigation keys and disposed at the front side of the mobile device 100, and some function keys disposed at lateral sides of the mobile device 100. If the touch screen unit 130 is enough to manipulate the mobile device, the key input unit 140 may be omitted.

The memory unit 150 stores programs and data required for operations of the mobile device 100, and may consist of a program region and a data region. The program region may store an operating system (OS) for booting and operating the mobile device 100, applications required for replaying multimedia contents, and applications required for executing various optional functions of the mobile device 100, such as a camera function, a sound reproduction function, an image or video play function, and the like. The data region stores data created while the mobile device 100 is used, such as images, videos, a phonebook, audio data, etc. Particularly, the memory unit 150 according to embodiments of the invention may store a critical touch moving distance and/or a critical touch holding duration, which may be required in order to unlock a touch lock state. Related descriptions will be given below.

The control unit 160 performs a function to control the whole operation of the mobile device 100. Specifically, the control unit 160 according to one embodiment of this invention determines whether a request to display a touch lock screen is inputted, and if so, controls the display unit 132 so that the touch lock screen may be displayed in the form of a cover layer that is disposed over a background screen and allows the background screen to be seen. If any application is currently executed, the control unit 160 controls the display unit 132 so that the touch lock screen may be displayed in the form of the cover layer that is overlaid on an execution screen of the current application while allowing the execution screen to be visible. Also, the control unit 160 controls the touch sensor unit 131 and determines whether a touch moving gesture is inputted after an initial touch, and if so, controls the display unit 132 so that the cover layer may be moved according to the touch moving gesture. Next, the control unit 160 determines whether an amount of the touch moving gesture exceeds a predefined critical distance, and if so, controls the display unit 132 to remove the cover layer and display the background screen or the application execution screen only. Then, the control unit 160 switches a touch lock state to a touch unlock state. If a touch release occurs before the touch moving gesture reaches the critical distance, the control unit 160 controls the display unit 132 to return the cover layer to the initial display state.

In another embodiment of this invention, the control unit 160 begins to measure a touch holding time or duration when a touch gesture is inputted on a touch lock screen in which a cover layer is overlaid on a background screen or an application execution screen. Then, the control unit 160 moves the cover layer by controlling the display unit 132 in response to a touch moving gesture, and determines whether a touch holding time exceeds a predefined critical time period and whether an amount of the touch moving gesture reaches a predefined critical distance. If the touch moving gesture reaches the critical distance before the touch holding duration exceeds the critical time, the control unit 160 controls the display unit 132 to remove the cover layer and display the background screen or the application execution screen only, and then switches a touch lock state to a touch unlock state. If the touch holding time exceeds the critical time period or if a touch release occurs before the touch moving gesture reaches the critical distance, the control unit 160 controls the display unit 132 to return the cover layer to the initial display state.

In still another embodiment of this invention, the control unit 160 recognizes the occurrence of missed events, and controls the display unit 132 so that a list of missed events may be also displayed on the cover layer of the touch lock screen. Then, the control unit 160 displays the display unit 132 to move the cover layer depending on a touch moving gesture, and determines whether an amount of the touch moving gesture reaches a predefined critical distance. If so, the control unit 160 controls the display unit 132 to remove the cover layer and to display the list of missed event. Alternatively, if the only one missed event occurs, the control unit 160 may control the display unit 132 to display a detailed page of the missed event instead of the list.

In yet another embodiment of this invention, the control unit 160 determines whether a touch gesture is inputted on a list of missed events or at any region other than the missed event list in the touch lock screen. If the touch gesture is inputted at a selected one of missed event items in the list and then a touch moving gesture is further inputted, the control unit 160 controls the display unit 132 to display a detailed page of the selected missed event item when a distance of the touch moving gesture reaches a predefined critical distance. If the touch gesture is inputted at any region other than the missed event list and then the touch moving gesture is further inputted, the control unit 160 controls the display unit 132 to display the list of missed events when an amount of the touch moving gesture reaches a predefined critical distance.

Figure 2:
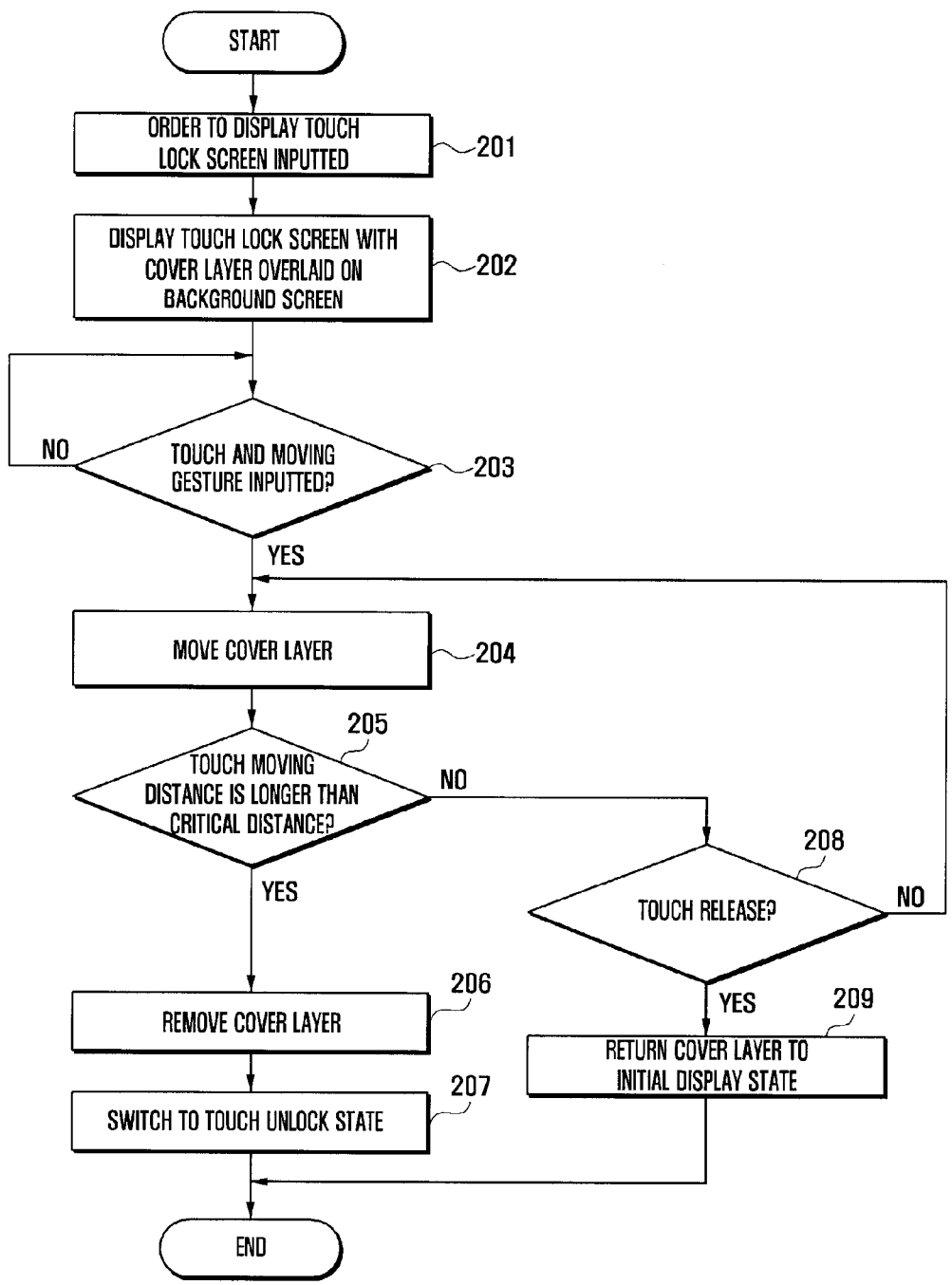
FIG. 2 is a flow diagram illustrating a method for performing a touch lock function of a touch-based mobile device in accordance with a first exemplary embodiment of the present invention.

FIG. 2 is a flow diagram illustrating a method for performing a touch lock function of a touch-based mobile device in accordance with a first exemplary embodiment of the present invention. The first embodiment of this invention corresponds to a case in which a touch lock state is unlocked depending on a touch moving distance.

Referring to FIG. 2, at the outset, the control unit 160 determines whether an order or a request to display a touch lock screen is inputted (step 201). In the embodiment, when a given time elapses after a user's input made on the touch screen unit 130 or the key input unit 140, the control unit 160 may determine that an order to display the touch lock screen is inputted. Alternatively, if a function key for turning on the screen is selected in the key input unit 140 while the screen is turned off, the control unit 160 may determine that an order to display the touch lock screen is inputted. In this case, the function key used to turn on the screen may be a hold key, a home key, or any other key. In alternate embodiment, if any touch gesture is inputted to the touch screen 130 by a user, the control unit 160 may determine that an order to display the touch lock screen is inputted.

When an order to display the touch lock screen is inputted, the control unit 160 controls the display unit 132 so that the touch lock screen may be displayed in the form of a cover layer that is overlaid on a background screen and allows the background screen to be visible (step 202). The cover layer, one of layers constituting the touch lock screen, is the uppermost layer in the touch lock screen. The background screen may be an idle screen which is also referred to as a standby screen. In the first embodiment, the cover layer may be formed of a transparent layer through which the underlying background screen can be seen. In this case, the cover layer may be colored or toned so that the cover layer can be distinguished from the underlying background screen. Alternatively, the cover layer may be formed of a translucent layer through which light partially passes. In still another embodiment, the cover layer may be formed of a transparent or translucent layer to which an animation effect is added. For instance, when the control unit 160 controls the display unit 132 to display the touch lock screen, a dynamic image may be used to represent the cover layer as glass being shining and to indicate that a transparent layer like glass is overlaid on the background screen. In yet another embodiment, the control unit 160 may control the display unit 132 to render an animation effect at regular intervals.

According to yet another embodiment, a touch unlock guide message may be displayed on the cover layer. This message may merely indicate that the present state is the touch lock state, e.g., "Phone locked", or indicate that a sweep gesture on the glass-like layer is needed to unlock the touch lock state, e.g., "Please sweep the glass out to unlock". Since the cover layer is transparent or translucent, it may be not easy for a user to intuitively know whether the present screen is the touch lock screen or the touch unlock screen. It is therefore desirable that a touch unlock guide message is displayed on the cover layer so as to allow a user to intuitively know that the present screen is the touch lock screen. Further, any other information such as date or time may be further displayed on the cover layer.

After the touch lock screen is displayed, the control unit 160 controls the touch sensor unit 131 and determines whether a touch and moving gesture is inputted on the cover layer (step 203). Specifically, when a user touches a certain point on the cover layer disposed at the top of the touch lock screen and then moves the touch point in arbitrary directions, the touch sensor unit 131 detects the touch and moving gesture. Then, the touch sensor unit 131 creates a detection signal that contains coordinate data of the initial touch point and its moving path, and transmits it to the control unit 160. Thereafter, the control unit 160 receives the detection signal and recognizes the initial touch point and the touch moving path.

Next, the control unit 160 controls the display unit 132 so that the cover layer may be moved and then displayed depending on the touch moving gesture (step 204). Namely, while the background screen in the touch lock screen is fixedly displayed, the cover layer on the touch lock screen is moved on the display unit 132 under the control of the control unit 160. With the cover layer moved, the underlying background screen is divided into a region still covered with the cover layer and the other region exposed. If the cover layer is colored or toned as discussed above, the exposed region of the background screen may be much definitely distinguished from the covered region. If any touch unlock guide message is displayed on the cover layer as discussed above, this message may be removed from the cover layer when the cover layer begins to move. If any information such as date or time is displayed on the cover layer as discussed above, such information may be moved together with the cover layer without disappearing.

Next, the control unit 160 determines whether the touch moving gesture is inputted longer than a predefined critical touch moving distance (step 205). According to the first embodiment, a touch moving gesture should travel not less long than a given distance so that the touch lock state can be switched to the touch unlock state. The control unit 160 has no interest in a touch moving direction, but checks a touch moving distance and compares it with a critical distance predefined in the memory unit 150.

If the touch moving gesture is inputted longer than the critical touch moving distance, the control unit 160 controls the display unit 132 in order to remove the cover layer and display the background screen only (step 206). Subsequently, the control unit 160 switches the touch lock state to the touch unlock state (step 207). Therefore, a user can touch a desired one of items arranged on the background screen to perform a particular function.

If the touch moving gesture is inputted less than the critical touch moving distance in the step 205, the control unit 160 controls the touch sensor unit 131 and determines whether the present touch is released (step 208). If so, the control unit 160 controls the display unit 132 so that the cover layer may return to the initial display state (step 209). Namely, the touch lock screen is again displayed in the same form as in the step 202, with the cover layer being completely overlaid on the background screen. If there is no touch release in the step 208, the process flow proceeds to the step 204 discussed above.

In the first embodiment, the mobile device 100 moves a cover layer of a touch lock screen in response to a touch moving gesture inputted by a user, removes the cover layer when the touch moving gesture reaches a critical touch moving distance, and then switches a touch lock state to a touch unlock state. If a touch release occurs before the touch moving gesture reaches the critical distance, the cover layer returns to the initial display state while the touch lock state remains unchanged.

Figure 3:
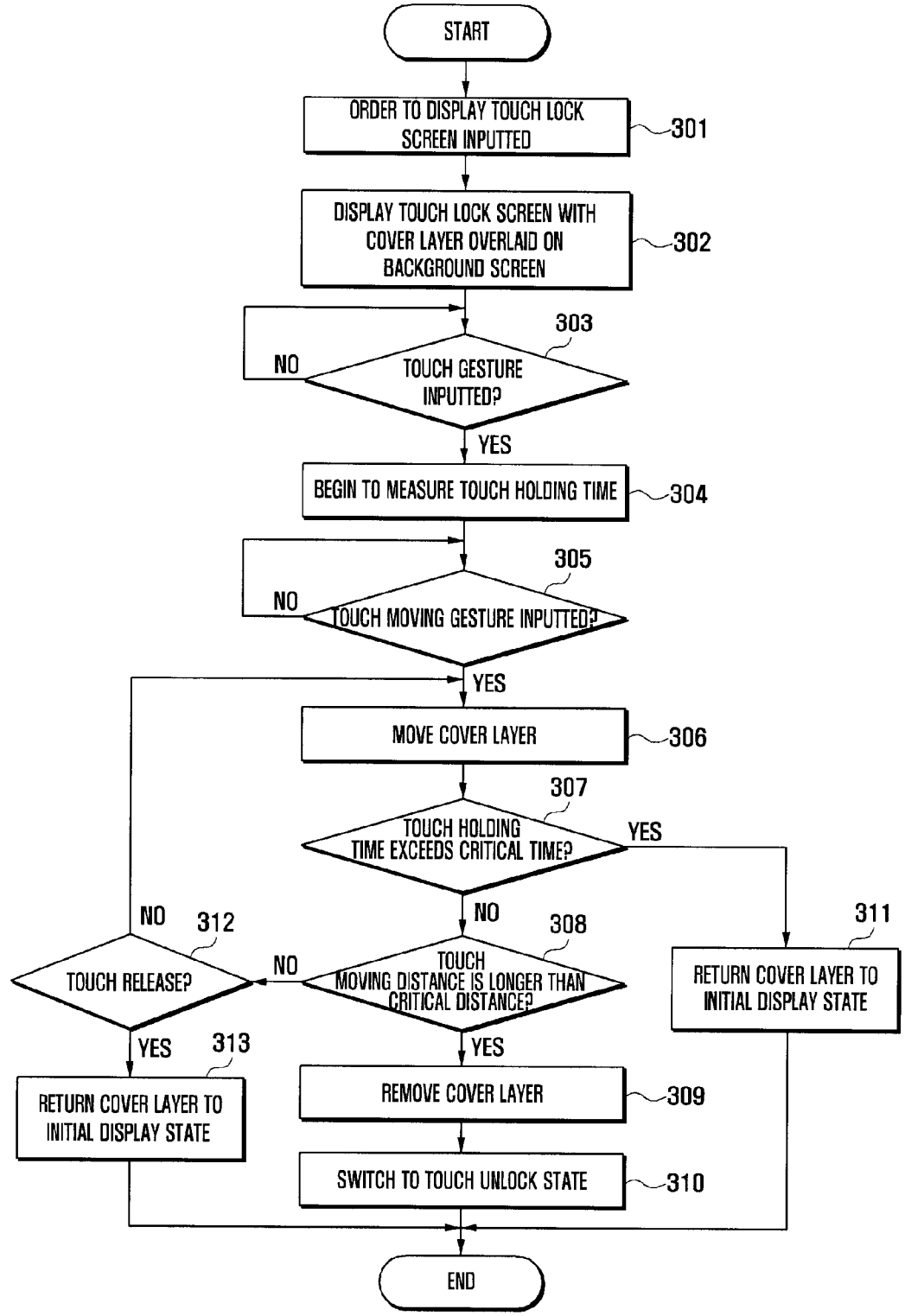
FIG. 3 is a flow diagram illustrating a method for performing a touch lock function of a touch-based mobile device in accordance with a second exemplary embodiment of the present invention.

FIG. 3 is a flow diagram illustrating a method for performing a touch lock function of a touch-based mobile device in accordance with a second exemplary embodiment of the present invention. The second embodiment of this invention corresponds to a case in which a touch lock state is unlocked depending on both a touch moving distance and a touch holding duration.

Referring to FIG. 3, steps 301 and 302 correspond to the steps 201 and 202 discussed earlier in FIG. 2, so their full descriptions are not repeated herein to avoid redundancy. Briefly, the control unit 160 determines whether an order to display a touch lock screen is inputted (step 301), and if so, controls the display unit 132 so that the touch lock screen may be displayed in the form of a cover layer that is overlaid on a background screen and allows the background screen to be seen (step 302).

Next, the control unit 160 controls the touch sensor unit 131 and determines whether a touch gesture is inputted on the cover layer (step 303). Specifically, when a user touches a certain point on the touch lock screen, the touch sensor unit 131 detects a touch gesture, creates a detection signal that contains coordinate data of the touch point, and transmits it to the control unit 160. Then, the control unit 160 receives the detection signal and recognizes the touch point.

After a touch gesture is inputted, the control unit 160 begins to measure a touch holding time (step 304). In the second embodiment, a user's touch should be released within a specified time period so that the touch lock state can be switched to the touch unlock state. Therefore, the control unit 160 needs to measure the duration of touch from a touch occurrence point to a touch release point.

Next, the control unit 160 controls the touch sensor unit 131 and determines whether a touch moving gesture is inputted (step 305). Specifically, the touch sensor unit 131 detects a touch moving gesture, creates a detection signal that contains coordinate data of a touch moving path, and transmits it to the control unit 160. Then, the control unit 160 receives the detection signal and recognizes the touch moving path.

Next, the control unit 160 controls the display unit 132 so that the cover layer may be moved and then displayed depending on the touch moving gesture (step 306). Namely, while the background screen in the touch lock screen is fixedly displayed, the cover layer in the touch lock screen is moved on the display unit 132 under the control of the control unit 160. Note that when the cover layer is being moved, the underlying background screen may be divided into a region still covered with the cover layer and the other region exposed.

Next, the control unit 160 determines whether a touch holding duration exceeds a predefined critical touch holding time period (step 307). The critical touch holding period is one of data stored in the memory unit 150 and corresponds to the restriction of time that must not be exceeded in order to unlock the touch lock state.

If a touch holding time does not exceed the critical time period, the control unit 160 determines whether a touch moving gesture is inputted longer than a predefined critical touch moving distance (step 308). In the second embodiment as well as in the first embodiment, a touch moving gesture should travel not less long than a given distance so that the touch lock state can be switched to the touch unlock state. The control unit 160 has no interest in a touch moving direction, but checks a touch moving distance and compares it with a critical distance predefined in the memory unit 150.

If the touch moving gesture is inputted longer than the critical touch moving distance, the control unit 160 controls the display unit 132 in order to remove the cover layer and display the background screen only (step 309). Subsequently, the control unit 160 switches the touch lock state to the touch unlock state (step 310). Therefore, a user can touch a desired one of items arranged on the background screen to perform a particular function.

If a touch holding time exceeds the critical time period in the step 307, the control unit 160 controls the display unit 132 so that the cover layer may return to the initial display state (step 311). Namely, the touch lock screen is again displayed in the same form as in the step 302, with the cover layer being wholly overlaid on the background screen. The touch lock state remains unchanged.

If the touch moving gesture is inputted less than the critical touch moving distance in the step 308, the control unit 160 controls the touch sensor unit 131 and determines whether the present touch is released (step 312). If so, the control unit 160 controls the display unit 132 so that the cover layer may return to the initial display state (step 313). The touch lock state remains unchanged. If there is no touch release in the step 312, the process flow proceeds to the step 306 discussed above.

In the second embodiment, the mobile device 100 begins to measure a touch holding duration when a touch gesture is inputted, and moves a cover layer of a touch lock screen in response to a touch moving gesture subsequently inputted by a user. If the touch moving gesture reaches a critical touch moving distance before the touch holding duration exceeds a critical time period, the mobile device removes the cover layer and then switches a touch lock state to a touch unlock state. If the touch holding time exceeds the critical time period or if a touch release occurs before the touch moving gesture reaches the critical distance, the cover layer returns to the initial display state while the touch lock state remains unchanged.

Figure 4:
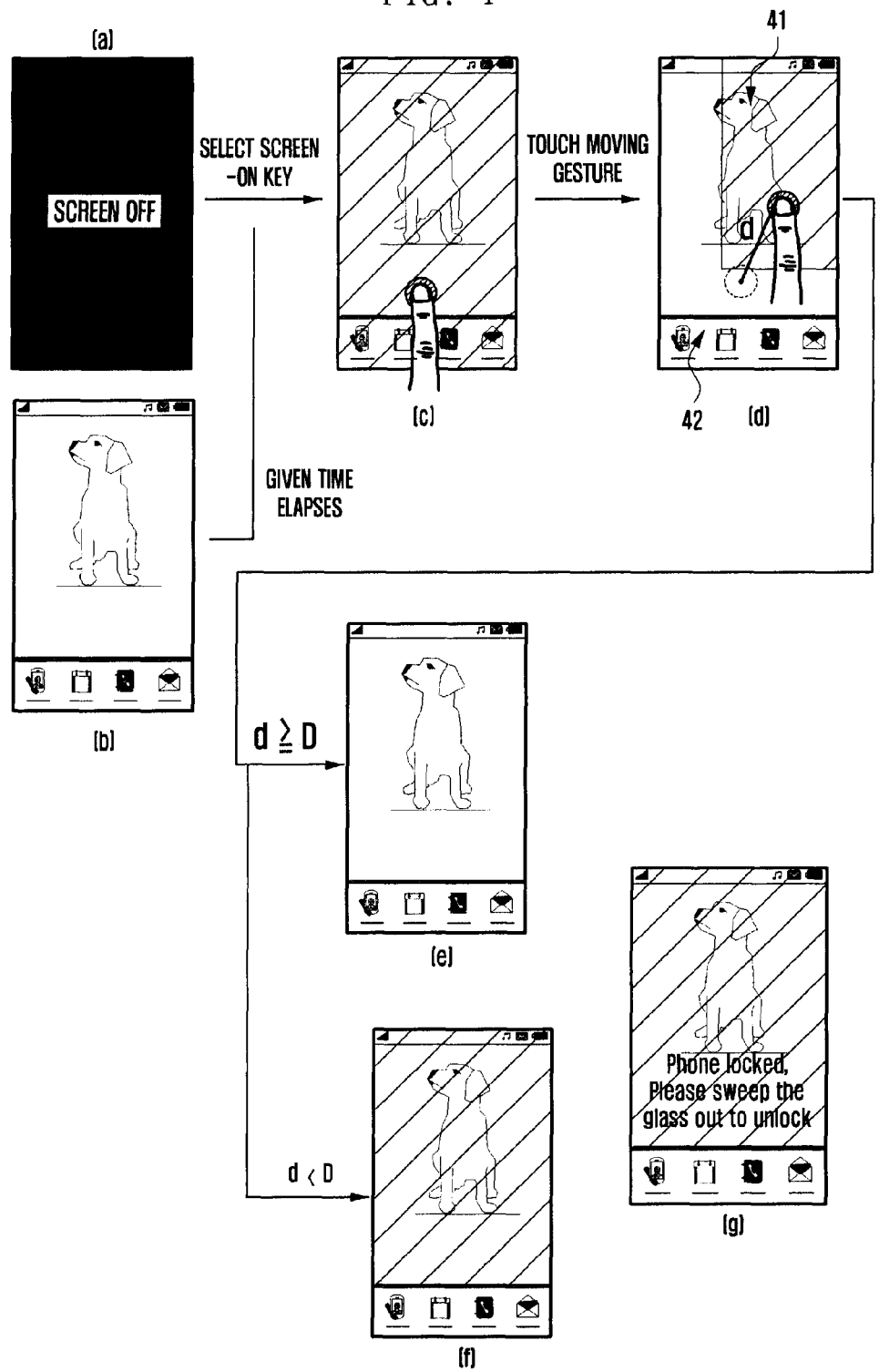
FIG. 4 is a diagram illustrating changes in a display screen of a touch-based mobile device while the method shown in FIG. 2 is executed.

FIG. 4 is a diagram illustrating changes in a display screen of a touch-based mobile device while the method shown in FIG. 2 is executed.

Referring to FIG. 4, a stage [a] shows a screen-off state of the display screen of the mobile device 100, and a stage [b] shows a touch unlock state of the display screen of the mobile device 100. In the stage [b], the mobile device 100 displays a background screen on the display screen. If a screen-on key is selected in the stage [a] or if a given time elapses in the stage [b], the mobile device 100 displays a touch lock screen. A stage [c] shows the touch lock screen in which a cover layer is overlaid on a background screen and allows the underlying background screen to be seen. The background screen is seen in the stage [c] representing the touch lock screen, but heavily toned in comparison with the stage [b]. The reason is that the cover layer stacked on the background screen is heavily toned. Alternatively, the touch lock screen may be formed as shown in a stage [g]. In comparison with the stage [c], the touch lock screen in the stage [g] further contains a message "Phone locked. Please sweep the glass out to unlock". This allows a user to intuitively know that the present screen is the touch lock screen.

The stage [c] shows a user's touch gesture made at a certain point on the touch lock screen. Then, a user initiates a touch moving gesture in arbitrary directions, thus moving the cover layer in the direction of the gesture. A stage [d] shows a movement of the cover layer according to the touch moving gesture. In the stage [d], the background screen is fixedly displayed, whereas the cover layer is displayed after moving by distance, (d). During the moving transition, the underlying background screen is divided into a region 41 still covered with the cover layer and the other region 42 exposed.

While moving the cover layer in response to a touch moving gesture, the mobile device 100 determines whether a touch moving distance (d) is greater than a predefined critical distance (D). If the touch moving distance (d) is equal to or greater than the critical distance (D), the mobile device 100 removes the cover layer, displays the background screen only, and switches the touch lock state to the touch unlock state. A stage [e] shows the touch unlock state of the display screen from which the cover layer is removed. If the touch moving distance (d) is smaller than the critical distance (D) and then if a touch release occurs, the mobile device 100 returns the cover layer to the initial display state. A stage [f] shows the display screen with cover layer in the initial display state, that is, the same screen as in the stage [c].

Changes in the display screen of the mobile device 100 shown in FIG. 4 may be also applied to the second embodiment of this invention. Specifically, when a touch gesture is inputted on the touch lock screen shown in the stage [c], the mobile device 100 begins to measure a touch holding duration. If a touch moving gesture is inputted, the mobile device 100 moves the cover layer as shown in the stage [d]. If a touch moving distance (d) is equal to or greater than a predefined critical distance (D) before the touch holding time (t) exceeds a predefined critical time period, the mobile device 100 removes the cover layer and displays the background screen only as shown in the stage [e]. If the touch holding time (t) exceeds the critical time (T) or if a touch release occurs before the touch moving gesture (d) reaches the critical distance (D), the mobile device 100 returns the cover layer to the initial display state as shown in the stage [f].

Figure 5:
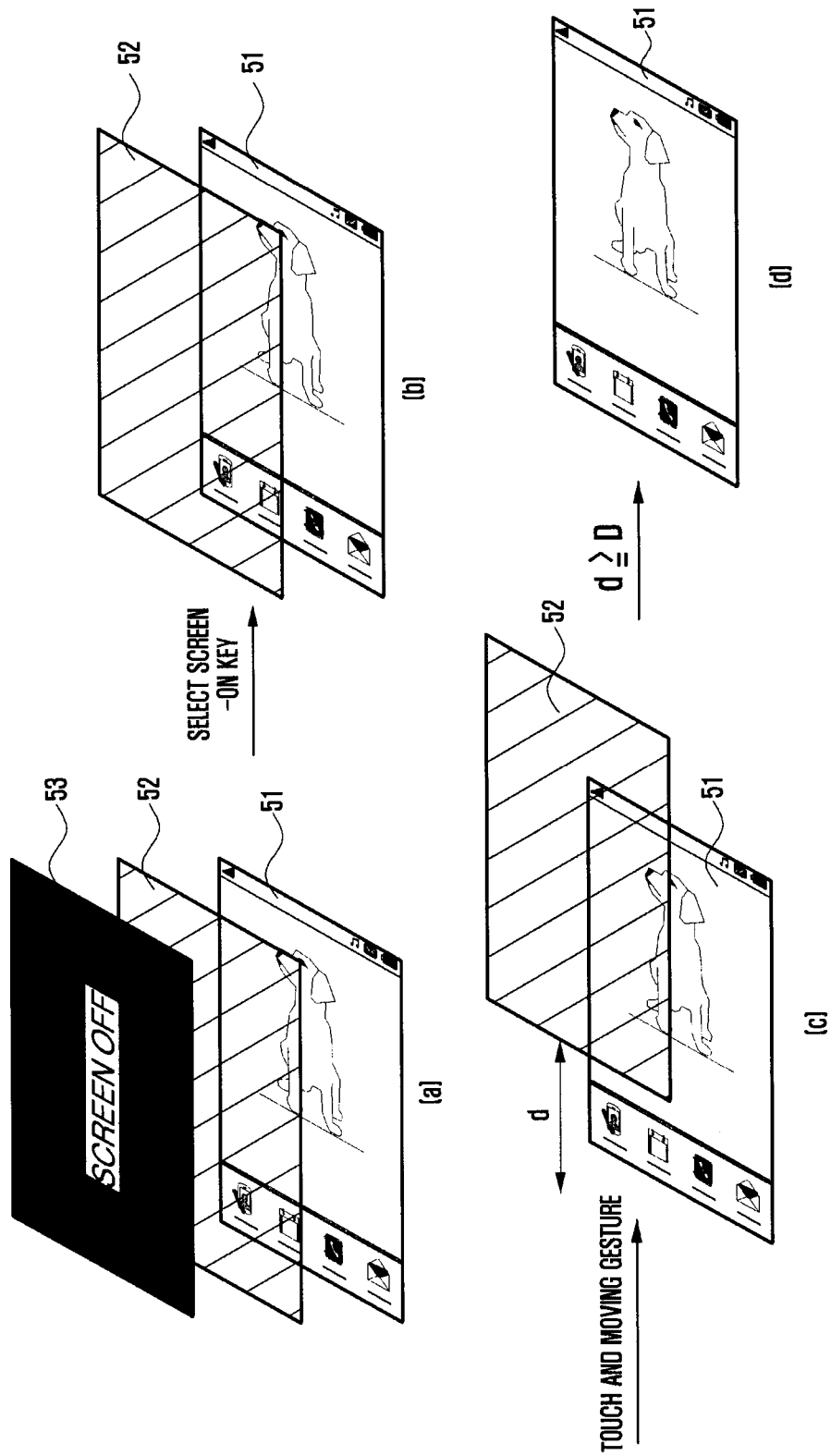
FIG. 5 is a diagram illustrating layers of the display screen shown in FIG. 4.

FIG. 5 is a diagram illustrating layers of the display screen shown in FIG. 4.

Referring to FIG. 5, a stage [a] shows layers that constitutes the screen of the mobile device 100 in a screen-off state. In the stage [a], the screen is composed of a background layer 51, a cover layer 52, and a screen-off layer 53. If a screen-on key is selected in the stage [a], the mobile device 100 displays a touch lock screen. As shown in a stage [b], the touch lock screen is composed of the background layer 51 and the cover layer 52. When a user touches a certain point on the cover layer 52 and then takes a touch moving gesture in arbitrary directions, the mobile device 100 displays the cover layer 52 as it is moving. A stage [c] shows the cover layer moved depending on the touch moving gesture. Also, the mobile device 100 determines whether a touch moving distance (d) is greater than a predefined critical distance (D), and if so, removes the cover layer 52 and displays the background layer 51 only. A stage [d] shows a state in which the background layer 51 only exists without the cover layer 52. The stage [d] corresponds to the display screen in the touch unlock state, and a user can touch a desired one of items arranged on the background layer 51 to perform a particular function.

Figure 6:
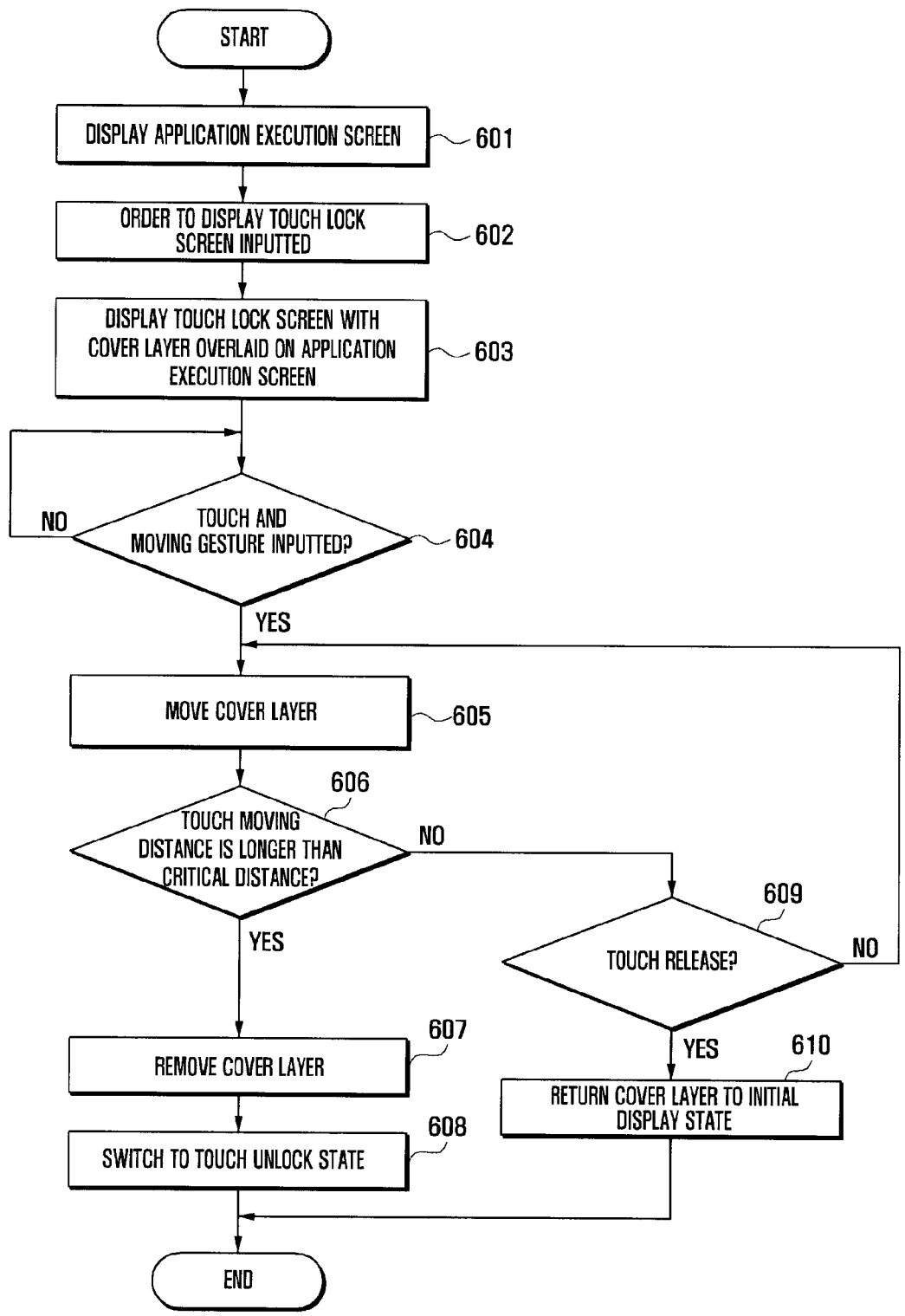
FIG. 6 is a flow diagram illustrating a method for performing a touch lock function of a touch-based mobile device in accordance with a third exemplary embodiment of the present invention.
Figure 7:
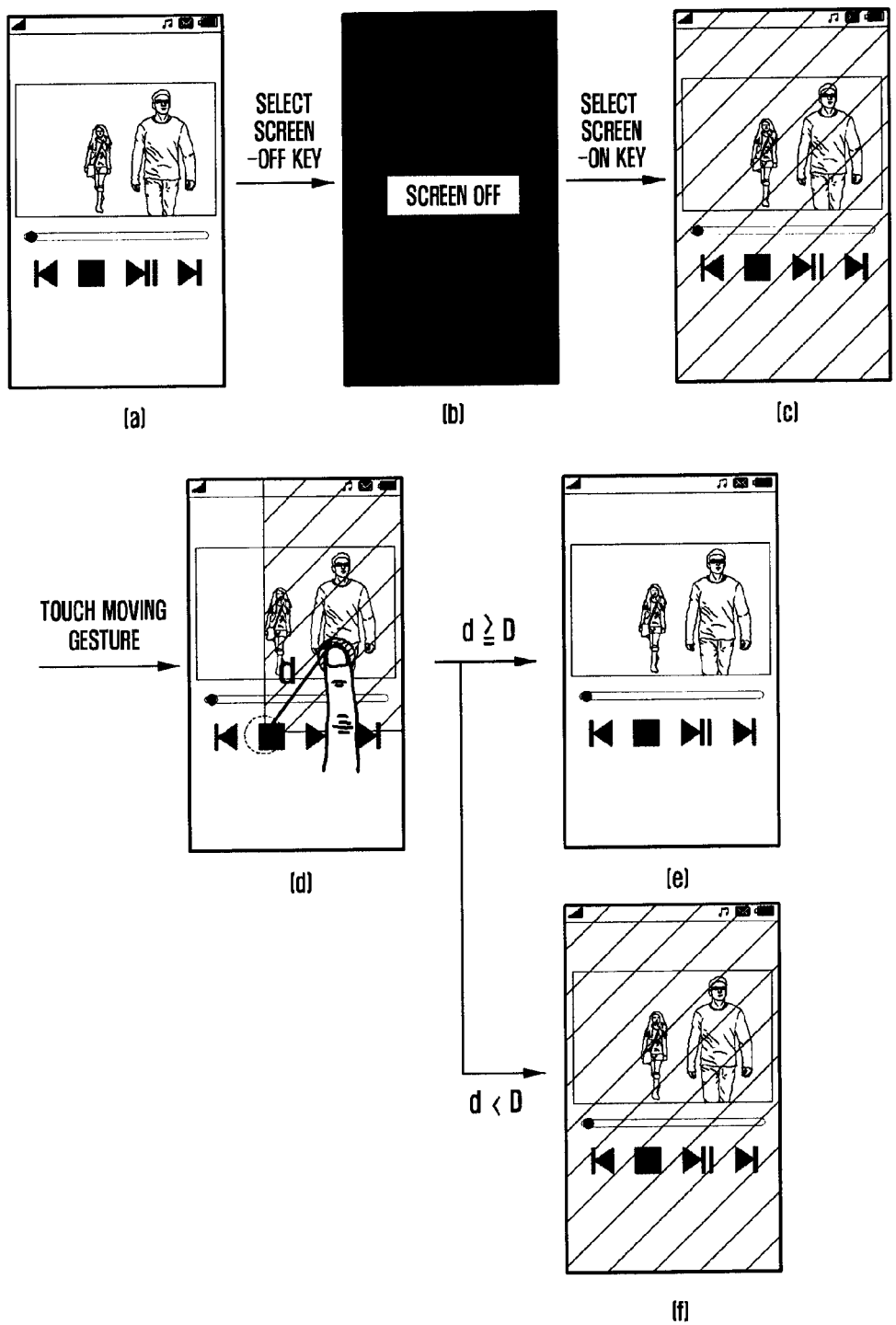
FIG. 7 is a diagram illustrating changes in a display screen of a touch-based mobile device while the method shown in FIG. 6 is executed.
Figure 8:
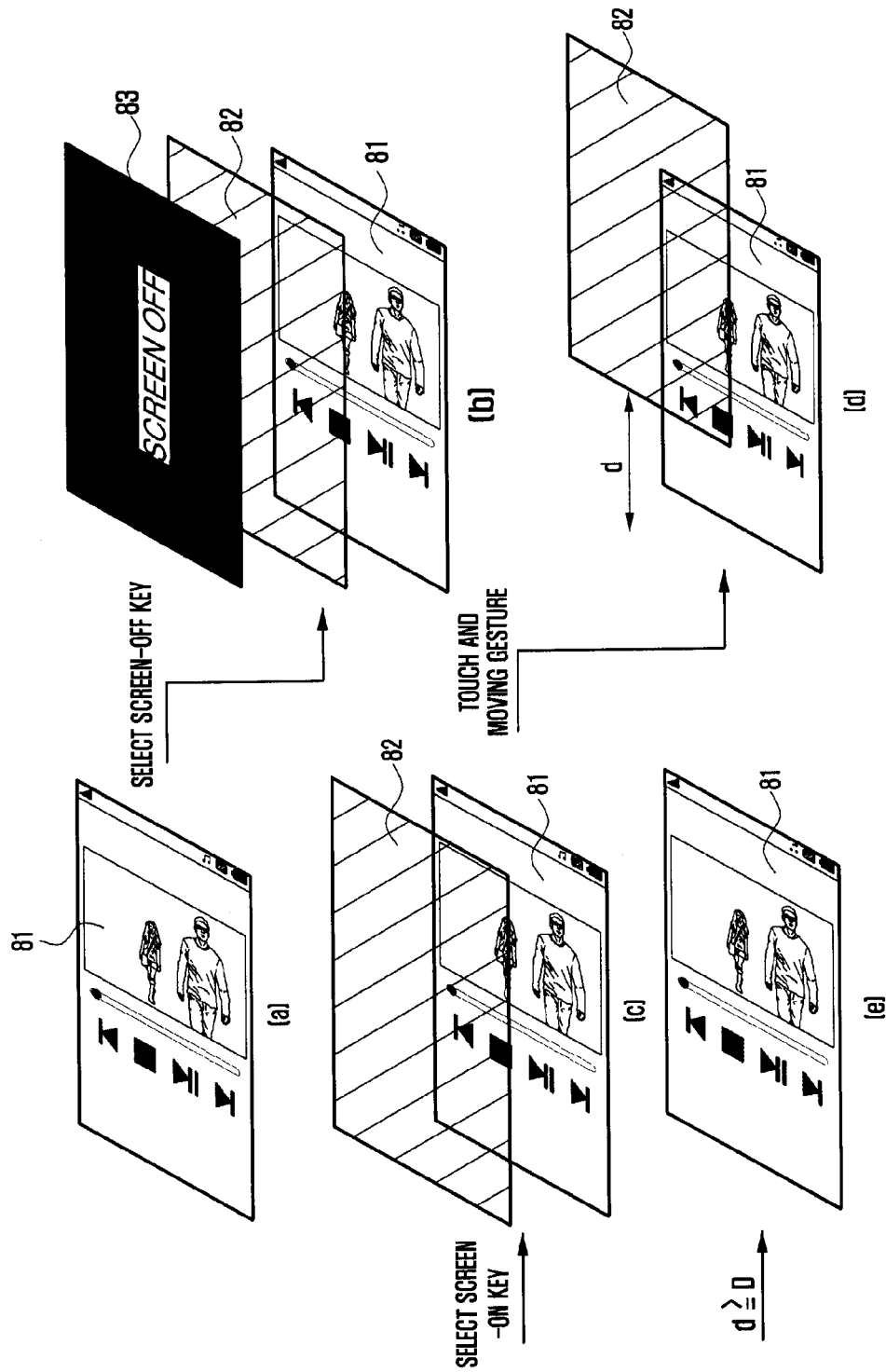
FIG. 8 is a diagram illustrating layers of the display screen shown in FIG. 7.

FIG. 6 is a flow diagram illustrating a method for performing a touch lock function of a touch-based mobile device in accordance a the third exemplary embodiment of the present invention. The third embodiment of this invention corresponds to a case in which a touch unlock screen is composed of an application execution screen and a cover layer. The following description will also refer to FIG. 7 illustrating changes in a display screen of the mobile device 100 and FIG. 8 illustrating layers of the display screen.

A process flow according to the third embodiment starts from a state in which the mobile device 100 executes a selected application. Executable applications may be a video playback application, a camera application, a music play application, a game application, or any other applications supported by the mobile device 100. The control unit 160 controls the display unit 132 and displays an application execution screen (step 601). A stage [c] of FIG. 7 shows a video playback screen as an example of the application execution screen. Referring to a stage [a] of FIG. 8, the application execution screen shown in the stage [a] of FIG. 7 is composed of a single layer 81.

Then, the control unit 160 determines whether an order to display a touch lock screen is inputted (step 602). According to the embodiment, when a given time elapses after a user's input made on the touch screen unit 130 or the key input unit 140, the control unit 160 may determine that an order to display the touch lock screen is inputted. For instance, when a stop or pause key is selected during a video playback, the control unit 160 may measure an elapse of time after a key selection and thereby determine whether an order to display a touch lock screen is inputted. Alternatively, when a screen-on key is selected through the key input unit 140 in a screen-off state, the control unit 160 may determine that an order to display the touch lock screen is inputted. For instance, when an order to turn off the screen is inputted during a video playback, the control unit 160 controls the display unit 132 and turns off the screen. By checking whether a screen-on key is inputted, the control unit 160 may determine whether an order to display a touch lock screen is inputted. A stage [b] of FIG. 7 shows a screen-off state resulted from a selection of a screen-off key in the stage [a] of FIG. 7. Referring to a stage [b] of FIG. 8, the screen-off screen shown in the stage [b] of FIG. 7 is composed of an application execution screen layer 81, a cover layer 82, and a screen-off layer 83.

When an order to display the touch lock screen is inputted, the control unit 160 controls the display unit 132 so that the touch lock screen may be displayed in the form of the cover layer 82 that is overlaid on the application execution screen layer 81 and allows the application execution screen layer 81 to be seen (step 603). The application execution screen layer 81 displays the execution of a currently running application. The cover layer 82 may be formed of a transparent layer, a translucent layer, a transparent or translucent layer with an animation effect, a transparent or translucent layer with a touch unlock guide message, or the like. A previous discussion made in the step 202 of FIG. 2 may be applied to the cover layer used in the step 603. A stage [c] of FIG. 7 shows the touch lock screen resulted from an input of a screen-on key in the stage [b] of FIG. 7. As shown in the stage [c] of FIG. 7, the touch lock screen has the cover layer overlaid on the application execution screen so that the application execution screen can be seen. In comparison with the stage [a] of FIG. 7, the screen shown in the stage [c] of FIG. 7 is heavily toned. Referring to a stage [c] of FIG. 8, the touch lock screen shown in the stage [c] of FIG. 7 is composed of the application execution screen layer 81 and the cover layer 82.

After the touch lock screen is displayed, the control unit 160 controls the touch sensor unit 131 and determines whether a touch and moving gesture is inputted on the cover layer (step 604). Namely, a user touches a certain point on the touch lock screen and then moves the touch point in arbitrary directions. The touch sensor unit 131 detects the touch and moving gesture, creates a detection signal that contains coordinate data of the initial touch point and its moving path, and transmits it to the control unit 160. Then, the control unit 160 receives the detection signal and recognizes the initial touch point and the touch moving path.

Next, the control unit 160 controls the display unit 132 so that the cover layer may be moved and then displayed depending on the touch moving gesture (step 605). While the cover layer is being moved, the underlying background screen is divided into a region still covered with the cover layer and the other region exposed. A stage [d] of FIG. 7 shows a movement of the cover layer depending on the touch moving gesture. In the stage [d] of FIG. 7, the background screen is fixedly displayed, whereas the cover layer is displayed as if moved. Further, a stage [d] of FIG. 8 shows the cover layer 82 moved depending on the touch moving gesture.

Next, the control unit 160 determines whether the touch moving gesture is inputted longer than a predefined critical touch moving distance (step 606). If so, the control unit 160 controls the display unit 132 in order to remove the cover layer and display the background screen only (step 607). Subsequently, the control unit 160 switches the touch lock state to the touch unlock state (step 608). A stage [e] of FIG. 7 shows the display screen in the touch unlock state in which the application execution screen only is displayed. Referring to a stage [e] of FIG. 8, the screen shown in the stage [c] of FIG. 7 is composed of the application execution screen layer 81 only.

If the touch moving gesture is inputted less than the critical touch moving distance in the step 606, the control unit 160 controls the touch sensor unit 131 and determines whether the present touch is released (step 609). If so, the control unit 160 controls the display unit 132 so that the cover layer may return to the initial display state (step 610). Namely, the touch lock screen is again displayed in the same form as in the step 603, with the cover layer being wholly overlaid on the background screen. A stage [f] of FIG. 7 shows the touch lock screen that is the same screen as shown in the stage [c] of FIG. 7. If there is no touch release in the step 609, the process flow proceeds to the step 605 discussed above.

Although the above discussion in the third embodiment the touch lock state is unlocked depending on a touch moving distance, the third embodiment may be also applied to another case where the touch lock state is unlocked depending on a touch holding time as well as a touch moving distance. Namely, the mobile device 100 begins to measure a touch holding duration when a touch gesture is inputted, and moves a cover layer of a touch lock screen when a touch moving gesture is subsequently inputted by a user. If the touch moving gesture reaches a critical touch moving distance before the touch holding time exceeds a critical time period, the mobile device removes the cover layer and then switches a touch lock state to a touch unlock state. If the touch holding time exceeds the critical time period or if a touch release occurs before the touch moving gesture reaches the critical distance, the cover layer returns to the initial display state while the touch lock state remains unchanged.

As discussed above, the third embodiment is characterized by a case where there is an order to display a touch lock screen during the execution of a selected application. Then, a transparent or translucent cover layer is overlaid on an execution screen of the currently running application to form the touch lock screen, so that a user can still find the running application without unlocking a touch lock state.

Figure 9:
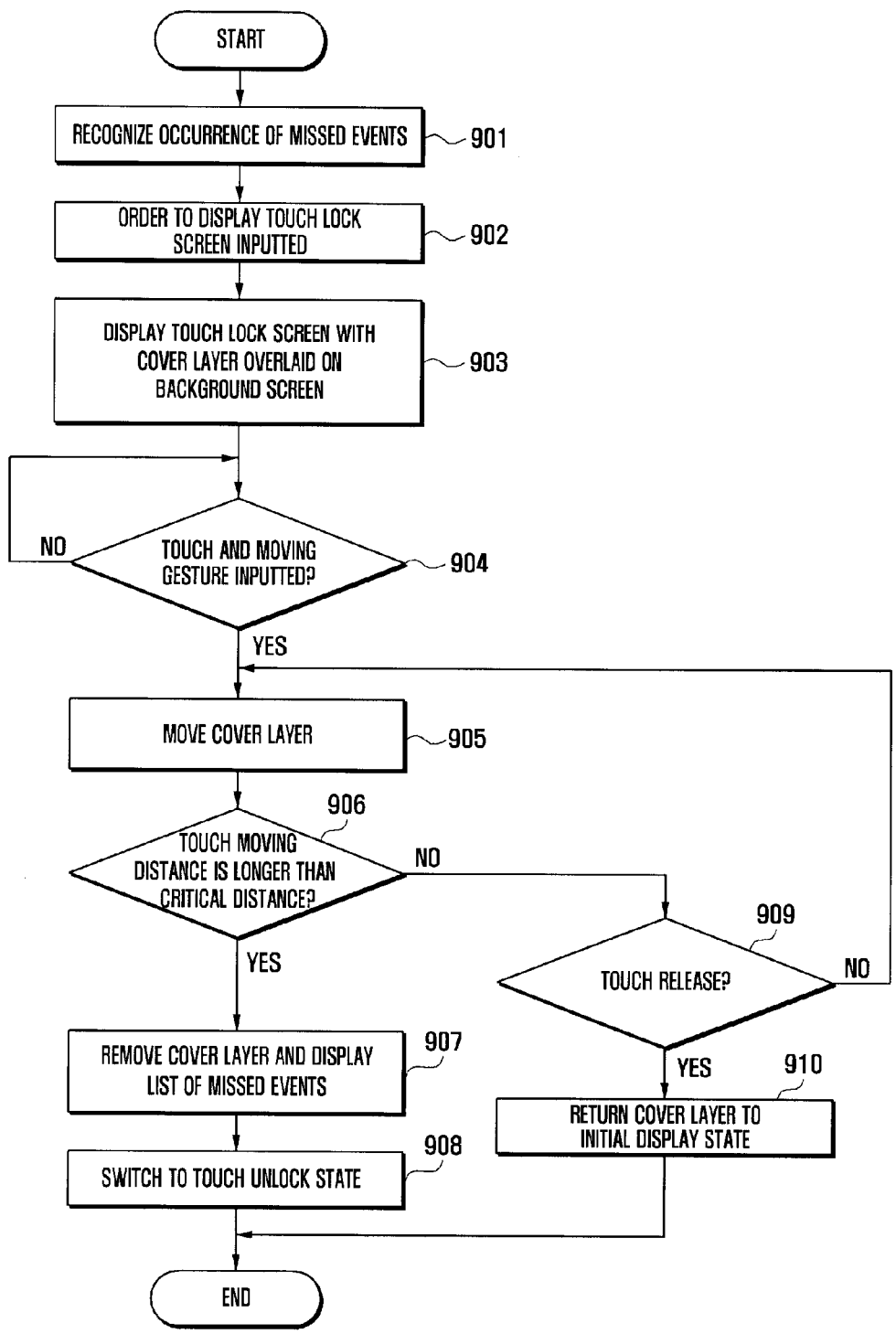
FIG. 9 is a flow diagram illustrating a method for performing a touch lock function of a touch-based mobile device in accordance with a fourth exemplary embodiment of the present invention.
Figure 10:
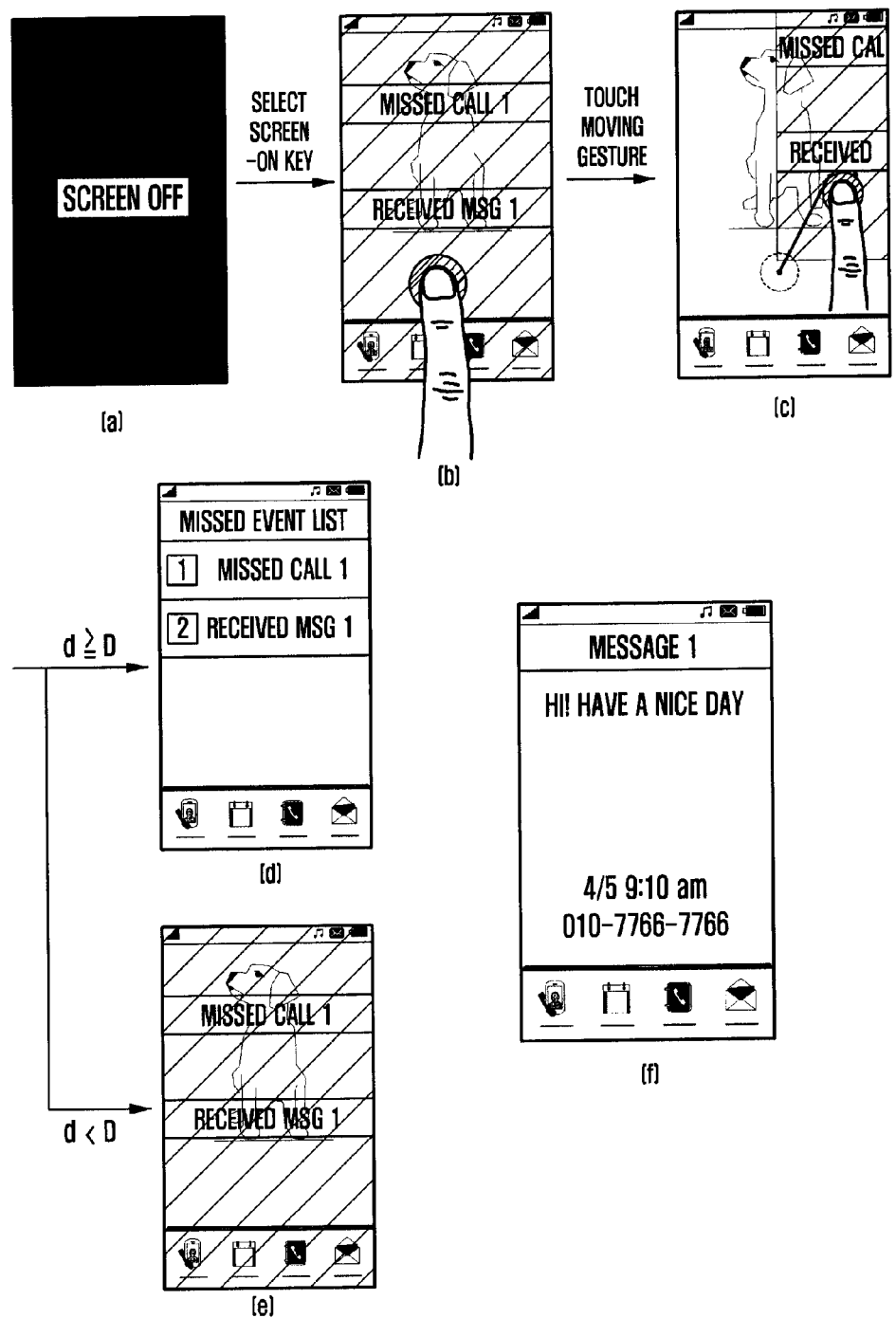
FIG. 10 is a diagram illustrating changes in a display screen of a touch-based mobile device while the method shown in FIG. 9 is executed.

FIG. 9 is a flow diagram illustrating a method for performing a touch lock function of a touch-based mobile device in accordance with a fourth exemplary embodiment of the present invention. The fourth embodiment of this invention corresponds to a case in which a missed event is displayed on a touch lock screen and then a related function is performed when a touch lock state is unlocked. The following description will also refer to FIG. 10 illustrating changes in a display screen of the mobile device 100.

At the outset, the control unit 160 recognizes the occurrence of at least one missed event (step 901). Herein, a missed event refers to any event that is not yet found out by a user among events occurring in the mobile device 100, such as a missed call, an unopened text or voice message, or the like. If any missed event occurs, the control unit 160 stores information about the missed event in the memory unit 150.

Then, the control unit 160 determines whether an order to display a touch lock screen is inputted (step 902). According to one embodiment, when a given time elapses after a user's input made on the touch screen unit 130 or the key input unit 140, the control unit 160 may determine that an order to display the touch lock screen is inputted. Alternatively, when a screen-on key is selected through the key input unit 140 in a screen-off state, the control unit 160 may determine that an order to display the touch lock screen is inputted. A stage [a] of FIG. 10 shows a screen-off state of the mobile device 100. In such a screen-off state, a user may input an order to display a touch lock screen by selecting a screen-on key.

When an order to display the touch lock screen is inputted, the control unit 160 controls the display unit 132 in order to display the touch lock screen in which a cover layer is overlaid on a background screen to allow the background screen to be seen and also contains a list of missed events (step 903). The cover layer may be formed of a transparent layer, a translucent layer, a transparent or translucent layer with an animation effect, a transparent or translucent layer with a touch unlock guide message, or the like. A previous discussion made in the step 202 of FIG. 2 may be applied to the cover layer used in the step 903. The list of missed events may be represented as text or image. Instead of the background screen, an execution screen of a currently running application or an execution screen of missed events may be used for the touch lock screen. A stage [b] of FIG. 10 shows the touch lock screen resulted from an input of a screen-on key in the stage [a] of FIG. 10. As shown in the stage [b] of FIG. 10, the touch lock screen has the cover layer overlaid on the background screen so that the background screen can be seen. Also, a missed event list of 'Missed Call 1' and 'Received Msg 1' is arranged in the cover layer.

After the touch lock screen is displayed, the control unit 160 controls the touch sensor unit 131 and determines whether a touch and moving gesture is inputted on the cover layer (step 904). Namely, a user touches a certain point on the touch lock screen and then moves the touch point in arbitrary directions. The touch sensor unit 131 detects the touch and moving gesture, creates a detection signal that contains coordinate data of the initial touch point and its moving path, and transmits it to the control unit 160. Then, the control unit 160 receives the detection signal and recognizes the initial touch point and the touch moving path. The stage [b] of FIG. 10 shows a user's touch gesture made at a certain point on the touch lock screen. A user may touch any point on the inside or outside of the missed event list.

Next, the control unit 160 controls the display unit 132 so that the cover layer may be moved and then displayed depending on the touch moving gesture (step 905). With the cover layer moved, the underlying background screen is divided into a region still covered with the cover layer and the other region exposed. A stage [c] of FIG. 10 shows a movement of the cover layer depending on the touch moving gesture. In the stage [c] of FIG. 10, the background screen is fixedly displayed, whereas the cover layer is displayed as if moved. At this time, the missed event list displayed in the cover layer is also moved.

Next, the control unit 160 determines whether the touch moving gesture is inputted longer than a predefined critical touch moving distance (step 906). If so, the control unit 160 controls the display unit 132 in order to remove the cover layer and display the missed event list (step 907). Subsequently, the control unit 160 switches the touch lock state to the touch unlock state (step 908). Therefore, a user can touch a desired one of items arranged in the missed event list to check a selected missed event. A stage [d] of FIG. 10 shows the display screen in the touch unlock state in which the missed event list is displayed. In an alternative embodiment where the only one missed event occurs in the step 901, the control unit 160 may remove the cover layer and display a detailed page of the only one missed event by controlling the display unit 132. A stage [f] of FIG. 10 shows a page of a received message as an example of a detailed page of a missed event. Namely, if the only one unopened message occurs as a missed event, the control unit 160 may remove the cover layer and display a received message page as shown in the stage [f] of FIG. 10 by controlling the display unit 132 in the step 907.

If the touch moving gesture is inputted less than the critical touch moving distance in the step 906, the control unit 160 controls the touch sensor unit 131 and determines whether the present touch is released (step 909). If so, the control unit 160 controls the display unit 132 so that the cover layer may return to the initial display state (step 910). Namely, the touch lock screen is again displayed in the same form as in the step 903, with the cover layer being wholly overlaid on the background screen. A stage [e] of FIG. 10 shows the touch lock screen that is the same screen as shown in the stage [b] of FIG. 10. If there is no touch release in the step 909, the process flow proceeds to the step 905 discussed above.

Although the above discussion in the fourth embodiment the touch lock state is unlocked depending on a touch moving distance, the fourth embodiment may be also applied to another case where the touch lock state is unlocked depending on a touch holding time as well as a touch moving distance. Namely, the mobile device 100 begins to measure a touch holding duration when a touch gesture is inputted, and moves a cover layer of a touch lock screen when a touch moving gesture is subsequently inputted by a user. If the touch moving gesture reaches a critical touch moving distance before the touch holding time exceeds a critical time period, the mobile device removes the cover layer and then switches a touch lock state to a touch unlock state. If the touch holding duration exceeds the critical time period or if a touch release occurs before the touch moving gesture reaches the critical distance, the cover layer returns to the initial display state while the touch lock state remains unchanged.

As discussed above, in the fourth embodiment the mobile device offers a list of missed events on the touch lock screen. This allows a user to easily find the occurrence of missed events without unlocking the touch lock state. In addition, a simple gesture of touching and moving any point in any directions may cause a switch to a missed event screen or its detailed page, thus affording enhanced convenience to a user.

Figure 11A:
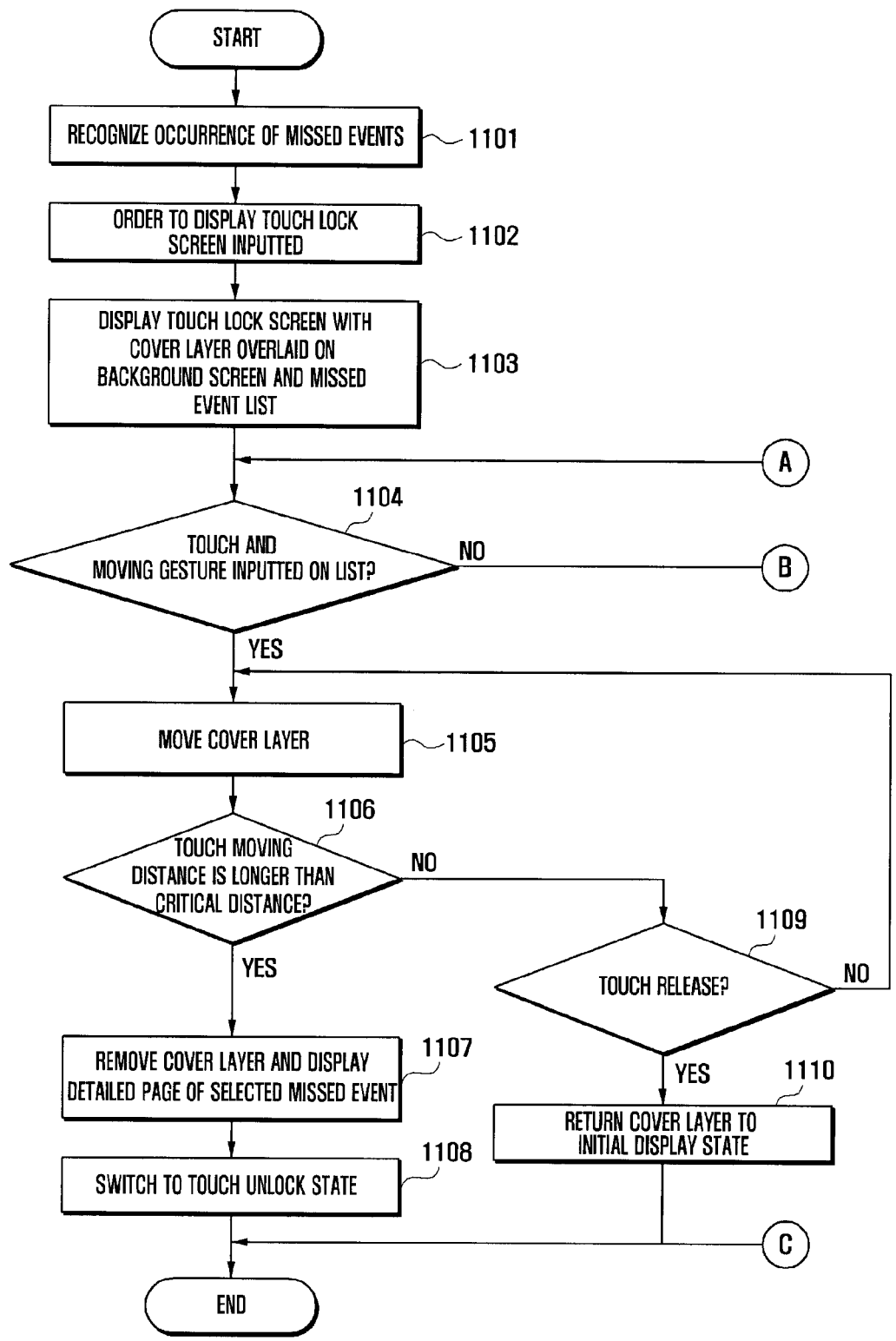
FIGS. 11A and 11B are flow diagrams illustrating a method for performing a touch lock function of a touch-based mobile device in accordance with a fifth exemplary embodiment of the present invention.
Figure 11B:
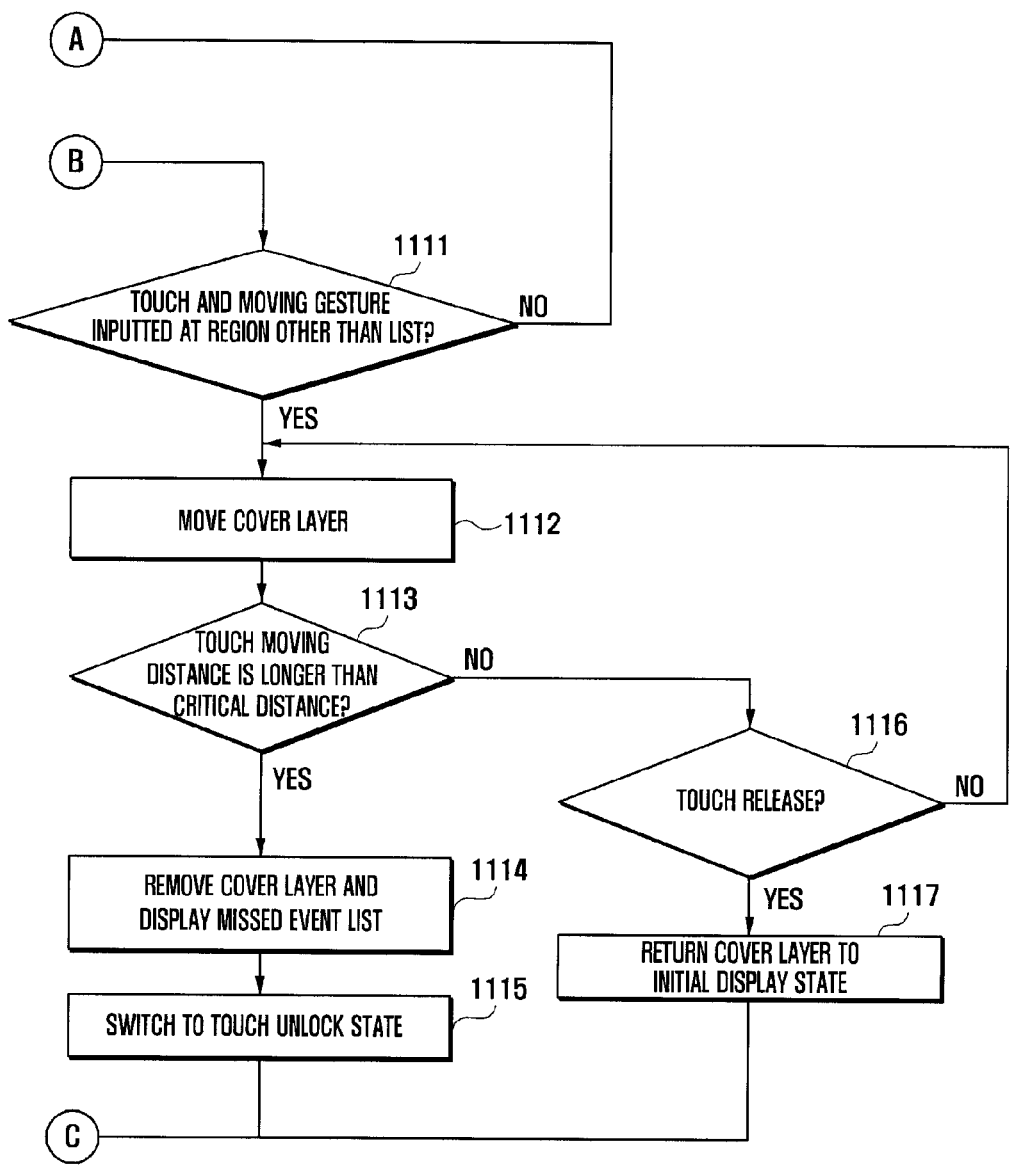

FIGS. 11A and 11B are flow diagrams illustrating a method for performing a touch lock function of a touch-based mobile device in accordance with a fifth exemplary embodiment of the present invention. Similar to the fourth embodiment, the fifth embodiment of this invention corresponds to a case in which a missed event list is displayed on a touch lock screen and then a related function is performed when a touch lock state is unlocked. The following description will also refer to FIG. 12 illustrating changes in a display screen of the mobile device 100.

Steps 1101 to 1103 correspond to the steps 901 to 903 discussed earlier in FIG. 9, so their full descriptions are not repeated herein to avoid redundancy. Briefly, the control unit 160 recognizes the occurrence of at least one missed event (step 1101), determines whether an order to display a touch lock screen is inputted (step 1102), and controls the display unit 132 in order to display the touch lock screen in which a cover layer is overlaid on a background screen to allow the background screen to be seen and also contains a list of missed events (step 1103). A stage [a] of FIG. 12 shows a screen-off state of the mobile device 100, and a stage [b] of FIG. 12 shows the touch lock screen resulted from an input of a screen-on key in the stage [a] of FIG. 12. As shown in the stage [b] of FIG. 12, the touch lock screen has the cover layer overlaid on the background screen so that the background screen can be seen. Also, a missed event list of 'Missed Call 1' and 'Received Msg 1' is arranged in the cover layer.

After the touch lock screen is displayed, the control unit 160 controls the touch sensor unit 131 and determines whether a touch and moving gesture is inputted in the missed event list (step 1104). The stage [b] of FIG. 12 shows a user's touch gesture made at a selected item 'Received Msg 1' in the missed event list.

Next, the control unit 160 controls the display unit 132 so that the cover layer may be moved and then displayed depending on the touch moving gesture (step 1105). While the cover layer is being moved, the underlying background screen is divided into a region still covered with the cover layer and the other region exposed. A stage [c] of FIG. 12 shows a movement of the cover layer depending on the touch moving gesture. At this time, the missed event list displayed in the cover layer is also moved.

Next, the control unit 160 determines whether the touch moving gesture is inputted longer than a predefined critical touch moving distance (step 1106). If so, the control unit 160 controls the display unit 132 in order to remove the cover layer and display a detailed page of the selected missed event item (step 1107). Subsequently, the control unit 160 switches the touch lock state to the touch unlock state (step 1108). A stage [d] of FIG. 12 shows the display screen in the touch unlock state in which the selected item page of missed events is displayed.

If the touch moving gesture is inputted less than the critical touch moving distance in the step 1106, the control unit 160 controls the touch sensor unit 131 and determines whether the present touch is released (step 1109). If so, the control unit 160 controls the display unit 132 so that the cover layer may return to the initial display state (step 1110). Namely, the touch lock screen is again displayed in the same form as in the step 1103, with the cover layer being wholly overlaid on the background screen. A stage [e] of FIG. 12 shows the touch lock screen that is the same screen as shown in the stage [b] of FIG. 12. If there is no touch release in the step 1109, the process flow proceeds to the step 1105 discussed above.

Meanwhile, if a touch and moving gesture is not inputted in the missed event list in the step 1104, the control unit 160 controls the touch sensor unit 131 and further determines whether a touch and moving gesture is inputted at any region other than the missed event list (step 1111). If so, the control unit 160 performs steps 1112 and 1113 which are the same as the steps 1105 and 1106.

If the touch moving gesture is inputted longer than a predefined critical touch moving distance in the step 1113, the control unit 160 controls the display unit 132 in order to remove the cover layer and display the missed event list (step 1114). The missed event list displayed in the step 1114 may be the same as shown in the stage [d] of FIG. 10, not in the stage [d] of FIG. 12. Subsequently, the control unit 160 switches the touch lock state to the touch unlock state (step 1115).

If the touch moving gesture is inputted less than the critical touch moving distance in the step 1113, the control unit 160 performs steps 1116 and 1117 which are the same as the steps 1109 and 1110.

Although the above discussion in the fifth embodiment the touch lock state is unlocked depending on a touch moving distance, the fifth embodiment may be also applied to another case where the touch lock state is unlocked depending on a touch holding time as well as a touch moving distance. Namely, the mobile device 100 begins to measure a touch holding duration when a touch gesture is inputted, and moves a cover layer of a touch lock screen when a touch moving gesture is subsequently inputted by a user. If the touch moving gesture reaches a critical touch moving distance before the touch holding time exceeds a critical time period, the mobile device removes the cover layer and then switches a touch lock state to a touch unlock state. If the touch holding time exceeds the critical time period or if a touch release occurs before the touch moving gesture reaches the critical distance, the cover layer returns to the initial display state while the touch lock state remains unchanged.

As discussed above, in the fifth embodiment the mobile device offers a list of missed events on the touch lock screen. This allows a user to easily find the occurrence of missed events without unlocking the touch lock state. In addition, a simple touch and moving gesture made in the selected missed event item may allow a user to check a detailed page of the selected missed event item, thus affording enhanced convenience to a user.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for unlocking an electronic device, the method comprising:
   when the electronic device is in a locked state, executing a lock screen including display of a cover layer overlaid on an entirety of an underlying screen such that the underlying screen is visible underneath the cover layer, the cover layer further including an event indicator;
   after display of the cover layer and the event indicator, in response detecting an object executing a touch gesture including a drag, displaying movement of an entirety of the cover layer in accordance with the drag; and
   responsive to detecting that the drag exceeds a critical distance, removing the cover layer from the lock screen, and switching the electronic device from the locked state to an unlocked state,
   wherein, after display of the cover layer and the event indicator, moving the cover layer includes moving the event indicator as part of the cover layer in accordance with a direction and a distance of the drag, such that the event indicator is removed from the lock screen when the cover layer is removed from the lock screen.

2. The method of claim 1, wherein the underlying screen is one of a background screen and an application execution screen.

3. The method of claim 1, wherein the cover layer is one of a transparent layer and a translucent layer.

4. The method of claim 1, wherein the cover layer and the event indicator are displayed undistortedly during movement of the cover layer and the event indicator in accordance with the direction and the distance of the drag.

5. The method of claim 1, wherein when the cover layer is moved in accordance with the drag beyond a display area of the electronic device, displaying the cover layer and the event indicator undistortedly includes excluding a portion of the cover layer and the event indicator from display while the locked state is maintained, and the method further comprising: responsive to a touch release occurring before the touch gesture reaches the critical distance, returning the event indicator to an initial display state while maintaining the electronic device in the locked state.

6. The method of claim 1, wherein the moving of the cover layer includes initiating measurement of a touch holding duration when the touch gesture is inputted.

7. The method of claim 6, further comprising returning the cover layer to an initial display state when the touch holding duration exceeds a predefined critical time period.

8. The method of claim 1, wherein the moving of the cover layer includes beginning to measure a touch holding duration when a touch gesture is inputted, wherein the detecting whether the drag exceeds the critical distance further includes determining whether the touch holding duration exceeds a predefined critical time period; and wherein removing the cover layer includes, if the touch gesture reaches the critical distance before the touch holding duration exceeds the critical time period, removing the cover layer from the lock screen to switch the locked state to the unlocked state, and if the touch holding duration exceeds the critical time period, returning the cover layer to an initial display state while the locked state remains unchanged.

9. The method of claim 1, wherein the cover layer is a transparent or translucent layer that includes a list of missed events.

10. An electronic device comprising:
a touch screen unit configured to detect a touch input; and
a control unit operatively coupled to memory, configured to:
when the electronic device is in a locked state, execute a touch lock screen including display of a cover layer overlaid on an entirety of an underlying screen, such that the underlying screen is visible underneath the cover layer, the cover layer further including an event indicator;
after display of the cover layer and the event indicator, control the touch screen unit to display movement of an entirety the cover layer in accordance with a drag in response to a detected object executing the drag via a touch gesture; and
responsive to detecting that the detected drag exceeds a predefined critical distance, remove the cover layer from the executed touch lock screen and switch the electronic device from the locked state to an unlocked state,
wherein, after display of the cover layer and the event indicator, moving the cover layer includes moving the event indicator as part of the cover layer in accordance with a direction and a distance of the drag, such that the event indicator is removed from the lock screen when the cover layer is removed from the lock screen.

11. The electronic device of claim 10, wherein the underlying screen includes one of a background screen and an application execution screen, and wherein the cover layer includes one of a transparent layer and a translucent layer.

12. The electronic device of claim 10, wherein when the cover layer is moved in accordance with the drag beyond a display area of the electronic device, a portion of the cover layer and the event indicator is excluded from display while the locked state is maintained, and wherein the control unit is further configured to return the event indicator to an initial display state and maintain the locked state if a touch release is detected before the touch gesture reaches the critical distance.

13. The electronic device of claim 10:
wherein the control unit is further configured to return the cover layer to an initial display state while the locked state remains unchanged if a touch release occurs before the a touch gesture reaches the critical distance; and wherein the control unit is further configured to: begin to measure a touch holding duration when a touch gesture is inputted; determine whether the touch holding duration exceeds a predefined critical time period; and when the touch holding duration exceeds the critical time period, return the cover layer to the initial display state while the locked state remains unchanged, and wherein the cover layer is removed from the touch lock screen, when the distance of the touch gesture reaches the critical distance before the touch holding duration exceeds the critical time period.

14. A method for unlocking an electronic device, the method comprising:
when the electronic device is in a locked state, executing a lock screen including a cover layer overlaid on an entirety of an underlying screen such that the underlying screen is visible through the cover layer, the cover layer including one or more event indicators;
after display of the cover layer and the event indicator, in response to detecting an object executing a touch gesture including a drag, displaying movement of an entirety of the cover layer in accordance with the drag; and
responsive to detecting that the drag exceeds a critical distance, removing the cover layer from display and switching the electronic device from the locked state to an unlocked state,
wherein, after display of the cover layer and the one or more event indicators and before the drag exceeds the critical distance, the cover layer and the one or more event indicators are moved according to a direction and a distance of the drag such that the one or more event indicators are removed from display when the cover layer is removed from display.

15. The method of claim 14, wherein the cover layer is one of a transparent layer and a translucent layer.

16. The method of claim 14, wherein a portion of the cover layer and the one or more event indicators is excluded from display while the locked state is maintained when the cover layer is moved in accordance with the drag beyond a display area of the electronic device, the method further comprising: responsive to a touch release occurring before the drag exceeds the critical distance, returning the one or more event indicators to an initial display state.

17. The method of claim 14, further comprising: determining whether a duration of the touch gesture exceeds a predefined critical time period, and when the duration exceeds the predefined critical time period before the drag exceeds the critical distance, returning the cover layer to an initial display state.

18. A method for unlocking an electronic device, the method comprising:
when the electronic device is in a locked state, executing a lock screen comprising a cover layer overlaid on an entirety of an underlying screen, such that the underlying screen is visible through the cover layer, the cover layer including an event indicator representing an event generated in the electronic device; and
after display of the cover layer and the event indicator, in response to detecting an object executing a touch gesture including a drag, displaying movement of an entirety of the cover layer in accordance with the drag; and
in response to detecting that the drag exceeds a critical distance, removing the cover layer from the lock screen and switching the electronic device from the locked state to an unlocked state
wherein after display of the cover layer and the event indicator and before the touch gesture exceeds the critical distance, the cover layer and the event indicator are moved according to a movement direction and distance of the touch gesture, such that the event indicator is removed from display when the cover layer is removed from display.

19. The method of claim 18, further comprising:
generating the cover layer based on the event indicator.

20. The method of claim 18, wherein the cover layer is translucent.

21. The method of claim 18, wherein the indication indicates a receipt of a message.

22. The method of claim 18, wherein the indication indicates a missed phone call.

23. The method of claim 1, wherein the object includes a finger.

24. The electronic device of claim 10, wherein the object includes a finger.

25. The method of claim 14, wherein the object includes a finger.

26. The method of claim 18, wherein the object includes a finger.

27. The method of claim 1, wherein the event indicator indicates at least one of a missed call and a message receipt.

28. The electronic device of claim 10, wherein the event indicator indicates at least one of a missed call and a message receipt.

29. The method of claim 14, wherein the event indicator indicates at least one of a missed call and a message receipt.

30. The method of claim 1, wherein the touch gesture is input outside of the event indicator while the event indicator is displayed.

31. The electronic device of claim 10, wherein the touch gesture is input outside of the event indicator while the event indicator is displayed.

32. The method of claim 14, wherein the touch gesture is input outside of the event indicator while the event indicator is displayed.

33. The method of claim 18, wherein the touch gesture is input outside of the event indicator while the event indicator is displayed.

* * * * *